3,106,570
METHOD OF MAKING ESTERS
John J. Jaruzelski, Roselle, N.J., and Chester S. Sheppard, Edgewood, Pa., assignors to United States Steel Corporation, a corporation of New Jersey
No Drawing. Filed Mar. 2, 1961, Ser. No. 92,789
10 Claims. (Cl. 260—410.5)

This invention relates to novel catalysts for esterfying aromatic hydroxy compounds with carboxylic acids. Formerly, the preparation of esters of aromatic compounds having hydroxyl groups was difficult and expensive as has been outlined in United States Patent 2,622,071. The object of our invention is to provide a novel method of making esters utilizing a group of catalysts comprising the chlorides and oxides of certain group V elements and alkoxides of aluminum and titanium that have been found unusually effective for catalyzing the esterification of aromatic hydroxy compounds and carboxylic acids.

The materials we have found particularly effective esterification catalysts are phosphorus trichloride, antimony trichloride, arsenic trichloride, bismuth trichloride, antimony trioxide, titanium tetrabutoxide, and aluminum isopropoxide. These novel catalysts give rapid esterifications. The resultant shorter reaction time allows esterification of unsaturated fatty acids without gelation and yields less highly colored products. The yields are very high, being almost quantitative in many instances. Exceedingly small amounts of catalyst are needed for the esterification, usually between one and four weight percent of the ester produced being employed. Previously, near-quantitative yields could not be obtained in the short reaction times made possible by our catalysts. For example, phenyl stearate was obtained in only 47% yield after a reaction time of 24 hours when sulphuric acid was used as the catalyst, although the latter was found to be more effective than phosphoric acid, zinc stearate, lead stearate, and triphenyl phosphite, a typical phosphorus-ester catalyst. As far as we are aware, titanium tetrabutoxide, phosphorus trichloride and bismuth trichloride are much more effective catalysts for esterifying phenols with carboxylic acids than other catalysts previously used. The resulting esters are useful in perfumery, pharmaceuticals, as specialty solvents and as plasticizers for polyvinyl-chloride resins.

A complete understanding of the invention may be obtained from the following typical examples showing how esters are made using our novel catalysts.

*Example 1.—2,2'-Biphenol Dipelargonate*

Pelargonic acid (0.25 mole), 2,2'-biphenol (0.125 mole), xylene (30 ml.), and titanium tetrabutoxide (2 ml.) were refluxed with a Dean-Stark water trap at a pot temperature of 230° C. After 5 hours and 45 minutes, 0.245 mole of water was obtained in the water trap. This corresponded to an esterification 98% complete. Distillation gave 2,2'-biphenol dipelargonate (98 grams) boiling in the range 231° to 232° C. at 0.5 mm. of mercury absolute pressure with a $n_D^{25}=1.5077$. The diester was an almost-colorless liquid, and its infrared spectrum was in accord with its structure.

When the same reactants were refluxed without a catalyst, only 0.117 mole of water was obtained after 24 hours of refluxing. This corresponded to an esterification 46.8% complete.

*Example 2.—Xylyl Myristates*

Myristic acid (0.25 mole), mixed isomeric xylenols (0.28 mole), xylene (25 ml.), and phosphorus trichloride (1.5 ml.) were refluxed as in Example 1. After 12 hours, esterification was esentially 100% complete. The ester was actually lighter-colored than the starting reactants. The product was partially cooled, subjected to a vacuum of 0.5 mm. mercury absolute pressure, and heated to 200° C. to remove the xylene and any unreacted xylenols. The product, a mixture of xylyl myristates, was an almost-colorless liquid having a $n_D^{25}=1.4804$. Its infrared spectrum was in accord with its structure. Distillation gave a water-white liquid product boiling in the range 190° to 200° C. at 0.7 mm. of mercury absolute pressure. Results were essentially the same with antimony trichloride or antimony trioxide when used as catalysts. With aluminum isopropoxide the esterification was 91% complete after 24 hours.

*Example 3.—o-Cresyl Palmitate*

Palmitic acid (0.33 mole), o-cresol (0.33 mole), xylene (30 ml.), and titanium tetrabutoxide (2 ml.) were refluxed as in Example 1. After one hour, esterification was 38.4% complete, and after five hours it was 88% complete. The pot temperature was 217° C. A 100% esterification was obtained after six more hours. Distillation gave a water-white liquid product, o-cresyl palmitate, boiling in the range 211° to 212° C. at 0.7 mm. of mercury absolute pressure.

*Example 4.—Xylyl Palmitates*

Palmitic acid (0.25 mole), mixed isomeric xylenols (0.28 mole), xylene (25 ml.), and bismuth trichloride monohydrate (2 grams) were refluxed as in Example 1. After 12 hours, esterification was esentially 100% complete. Distillation gave a colorless liquid product, xylyl palmitates, boiling in the range 196° to 208° C. at 0.2 mm. of mercury absolute pressure. With arsenic trichloride as catalyst, the esterification was 73.3% complete after 17 hours.

*Example 5.—Cresyl Benzoates*

Benzoic acid (0.67 mole), mixed m- and p-cresols (0.69 mole), xylene (20 ml.), and titanium tetrabutoxide (2 grams) were refluxed as in Example 1. After 18 hours, esterification was 98% complete. Distillation gave the m- and p-cresyl benzoates as a colorless liquid boiling in the range 120° to 148° C. at 0.35 mm. of mercury absolute pressure.

*Example 6.—o-Cresyl Oleate*

Oleic acid (0.33 mole), o-cresol (0.36 mole), xylene (25 ml.), and titanium tetrabutoxide (2 grams) were refluxed as in Example 1. After 6 hours, esterification was 90% complete. Distillation gave o-cresyl oleate as a colorless liquid boiling in the range 190° to 207° C. at 0.25 mm. mercury absolute pressure.

*Example 7.—o-Cresyl Isosebacate*

Isosebacic acid (0.17 mole), o-cresol (0.36 mole), xylene (30 ml.), and phosphorus trichloride (2 ml.) were refluxed as in Example 1. After 12 hours, esterification was essentially 100% complete. Distillation gave an almost-colorless liquid product, bis(o-cresyl)isosebacate, boiling in the range 214° to 226° C. at 0.35 mm. of mercury absolute pressure.

*Example 8.—Poly-(2,2'-Biphenol Adipate)*

Adipic acid (0.25 mole), 2,2'-biphenol (0.25 mole), xylene (30 ml.), and phosphorus trichloride (1.5 ml.) were refluxed as in Example 1. After 12 hours, 0.44 mole of water was obtained in the water trap. This corresponded to an esterification 88% complete. The light-colored polyester product was found to have a molecular weight of between 3100 and 3500 by an end-group titration.

*Example 9.—3,3',5,5'-Tetrachloro-2,2'-Biphenol Dipelargonate*

3,3',5,5'-tetrachloro-2,2'-biphenol (0.167 mole), pelargonic acid (0.33 mole), xylene (30 ml.), and phosphorus trichloride (1.7 ml.) were refluxed as in Example 1. After 20 hours, esterification was 95% complete. Distillation gave the 3,3',5,5'-tetrachloro-2,2'-biphenol dipelargonate as a light-yellow liquid boiling in the range 259.5° to 262° C. at 0.35 mm. of mercury absolute pressure. With titanium tetrabutoxide as catalyst, the esterification was 95% complete after 12 hours.

*Example 10.—2,2'-Biphenol Distearate*

Stearic acid (0.65 mole), 2,2'-biphenol (0.33 mole), phosphorus trichloride (2 ml.), and xylene (40 ml.) were refluxed as in Example 1. After 16 hours, esterification was 94% complete. Distillation gave the 2,2'-biphenol distearate, a white solid melting in the range 52° to 55° C. The infrared spectrum was in accord with its structure.

While the above examples illustrate preferred methods for making a number of esters, other reactants and conditions of operation may be used without departing from the spirit of the invention. The catalysts of invention are of general use in the esterification of aromatic hydroxy compounds with carboxylic acids, some typical aromatic hydroxy compounds include:

| | |
|---|---|
| Phenol | 4,4'-biphenol |
| o-Cresol | Bisphenol |
| m-Cresol | α-Naphthol |
| p-Cresol | β-Naphthol |
| Chlorophenol | Hydroxyanthracene |
| Nitrophenol | Hydroxyphenanthrene |
| 2,2'-biphenol | Hydroxydibenzofuran |
| 3,3',5,5'-tetrachloro-2,2'-biphenol | Hydroxycarbazole |

Suitable carboxylic acids for esterification with the above aromatic hydroxy compounds include:

| | |
|---|---|
| Acetic acid | $\Delta^{3,5}$-hexanedioic acid |
| Butyric acid | Phenylacetic acid |
| Caprylic acid | Phenylpropionic acid |
| Pelargonic acid | α-Bromobutyric acid |
| Lauric acid | γ-Keto-pentanoic acid |
| Myristic acid | δ-Keto-hexanoic acid |
| Palmitic acid | ε-Keto-Octanoic acid |
| Stearic acid | Isopropoxypropionic acid |
| Eicosanoic acid | Benzoic acid |
| Oleic acid | Naphthalenecarboxylic acid |
| Elaidic acid | Anthracenecarboxylic acid |
| Linoleic acid | Maleic acid |
| Linolenic acid | β-(2 carboxyphenyl)-acrylic acid |
| Dibenzofurancarboxylic acid | |
| 2-carboxyfuran | Phthalic acid |
| 2-carboxythiophene | Isophthalic acid |
| Nicotinic acid | Terephthalic acid |
| Isonicotinic acid | Naphthalene-1,4-dicarboxylic acid |
| Picolinic acid | |
| Carboxycyclohexane | Anthracene-9,10-dicarboxylic acid |
| Carboxybiphenyl | |
| Oxalic acid | 2,2'-diphenic acid |
| Adipic acid | 2,8-dicarboxydibenzofuran |
| Azelaic acid | 3,6-dicarboxycarbazole |
| Fumaric acid | Citric acid |
| Crotonic acid | 1,2,4,5-tetracarboxybenzene |

The non-hydroxy hydrogen atoms in the above aromatic hydroxy compounds and carboxylic acids may be replaced with various radicals such as halo-(fluoro-, chloro-, bromo-, iodo-), alkyl-(methyl-, butyl-, isooctyl-, dodecyl-), aryl-(phenyl-, naphthyl-), alkylaryl-(methylnaphthyl-, tolyl-, xylyl-), arylalkyl-(benzyl-, naphthylethyl-), alkoxy-(methoxy-, isopropoxy-), or acyl-(acetyl-, propionyl-, benzoyl-). The substituent or substituents may be one or more nitro ($NO_2$—) groups, which may be retained in the product or reduced in a known manner to amino ($NH_2$—) groups. About the only common substituent groups that may be present in an aromatic hydroxy compound and give trouble during the esterification are the amino ($NH_2$—) and sulpho ($SO_3$—) groups. Example 9 illustrates the esterification of a phenol having four non-hydroxy hydrogen atoms replaced by chlorine.

Example 8 illustrates the use of our catalysts in making esters that are condensation polymers. When a dicarboxylic or polycarboxylic acid is esterified with a compound containing two or more hydroxyl groups, water is split out, and a compound of high molecular weight is formed. In example 8, the polymer formed is necessarily of the straight-chain type, since both the acid and the alcohol are difunctional. If either the acid or the alcohol contains three or more functional groups, the polymers formed therefrom tend to be cross-linked; that is, the extra hydroxyl or carboxyl groups serve as starting points for branched chains.

These esterifications may be carried out at temperatures between 180° and 290° C., the preferred range being 215° to 240° C. The length of time the reactions are run depends upon the catalyst employed, the yield desired, and to some extent the nature of the aromatic hydroxy compound and carboxylic acid used. For maximum yields, the examples serve to show how long an esterification should be run. However, yields of above 90% may be obtained in a much shorter reaction time than shown in the examples. This is partially illustrated in Examples 1, 3, and 6. The kinetics of the reaction cause this phenomenon; that is, the time required to go from 95% esterification to 99% esterification is much longer than the time required to go from 85% to 89% esterification.

In the above examples, the xylene serves two purposes, namely it acts as an azeotroping agent for removing the water of esterification and aids in the control of the reaction temperature. By adding or removing xylene, one may lower or raise the pot temperature to the optimum level. In place of xylene there may be used any other water-azeotroping material that will not react with the reactants, such as, benzene, toluene, or carbon tetrachloride. Carbon tetrachloride, unlike the others, is heavier than water, hence a modified Dean-Stark trap would be used.

The invention is characterized by several distinct advantages that make it possible to recover better yields of high purity products from esterification reactions than has been possible heretofore. In the first place, higher esterification rates with shorter time periods to substantially complete the esterification reactions have resulted in almost quantitative yields in many instances. Secondly, these reactions have yielded high-purity products with suppression of unwanted secondary reactions, for example, those leading to poorer color and gelation, where unsaturated carboxylic acids are esterified. Furthermore, these advantages have been obtained with use of exceedingly small amounts of catalyst, usually between one and four percent by weight of the ester produced being employed.

Although we have disclosed herein the preferred practice of our invention, we intend to cover as well any change or modification therein which may be made without departing from the spirit and scope of the invention.

We claim:

1. A method of making an ester comprising refluxing with removal of the water of esterification a phenol containing six to about twenty carbon atoms and free from substituents containing an active hydrogen atom and a carboxylic acid containing two to about twenty carbon atoms and free from substituents containing an active hydrogen atom in the presence of a catalytic quantity not exceeding about four weight percent of said ester product of a catalyst chosen from the group consisting of aluminum isopropoxide, antimony trichloride, antimony trioxide, bismuth trichloride, phosphorus trichloride and titanium tetrabutoxide and recovering the ester.

2. A method of making an ester comprising refluxing with removal of the water of esterification a phenol containing six to about twenty carbon atoms and free from substituents containing an active hydrogen atom and a carboxylic acid containing two to about twenty carbon atoms and free from substituents containing an active hydrogen atom in the presence of a catalytic quantity not exceeding about four weight percent of said ester product of titanium tetrabutoxide and recovering the ester.

3. A method of making an ester comprising refluxing with removal of the water of esterification a phenol containing six to about twenty carbon atoms and free from substituents containing an active hydrogen atom and a carboxylic acid containing two to about twenty carbon atoms and free from substituents containing an active hydrogen atom in the presence of a catalytic quantity not exceeding about four weight percent of said ester product of phosphorus trichloride and recovering the ester.

4. A method of making an ester comprising refluxing with removal of the water of esterification a phenol containing six to about twenty carbon atoms and free from substituents containing an active hydrogen atom and a carboxylic acid containing two to about twenty carbon atoms and free from substituents containing an active hydrogen atom in the presence of a catalytic quantity not exceeding about four weight percent of said ester product of bismuth trichloride and recovering the ester.

5. A method of making 2,2'-biphenol dipelargonate comprising refluxing in the presence of a water-azeotroping agent substantially stoichiometric quantities of pelargonic acid and 2,2'-biphenol and a catalytic quantity of titanium tetrabutoxide not exceeding about four weight percent of the ester, removing water of esterification and recovering the ester.

6. A method of making cresyl benzoates comprising refluxing in the presence of a water-azeotroping agent substantially stoichiometric quantities of benzoic acid and mixed m-cresol and p-cresol and a catalytic quantity of titanium tetrabutoxide not exceeding about four weight percent of the ester, removing water of esterification and recovering the ester.

7. A method of making xylyl palmitates comprising refluxing in the presence of a water-azeotroping agent substantially stoichiometric quantities of palmitic acid and mixed isomeric xylenols and a catalytic quantity of bismuth trichloride monohydrate not exceeding about four weight percent of the ester, removing water of esterification and recovering the ester.

8. A method of making o-cresyl oleate comprising refluxing in the presence of a water-azeotroping agent substantially stoichiometric quantities of oleic acid and o-cresol and a catalytic quantity of titanium tetrabutoxide not exceeding about four weight percent of the ester, removing water of esterification and recovering the ester.

9. A method of making poly-(2,2'-biphenol adipate) comprising refluxing in the presence of a water-azeotroping agent substantially stoichiometric quantities of adipic acid and 2,2'-biphenol and a catalytic quantity of phosphorus trichloride not exceeding about four weight percent of the ester, removing water of esterification and recovering the ester.

10. A method of making 3,3',5,5'-tetrachloro-2,2'-biphenol dipelargonate comprising refluxing in the presence of a water-azeotroping agent substantially stoichiometric quantities of pelargonic acid and 3,3',5,5'-tetrachloro-2,2'-biphenol and a catalytic quantity of phosphorus trichloride not exceeding about four weight percent of the ester, removing water of esterification and recovering the ester.

References Cited in the file of this patent

UNITED STATES PATENTS

| 655,208 | Diehl | Aug. 7, 1900 |
| 2,087,213 | Skraup | July 13, 1937 |
| 2,309,335 | Bruson | Jan. 26, 1943 |
| 2,727,881 | Caldwell et al. | Dec. 20, 1955 |
| 2,822,348 | Haslam | Feb. 4, 1958 |
| 2,914,556 | Hostettler et al. | Nov. 24, 1959 |
| 2,945,871 | Murray | July 19, 1960 |

FOREIGN PATENTS

| 783,814 | Great Britain | Oct. 2, 1957 |
| 70,483 | Germany | June 17, 1892 |
| 71,446 | Germany | Dec. 3, 1892 |

OTHER REFERENCES

Noller: Chemistry of Organic Compounds, 2nd Ed., pages 166-9 (1957), (Saunders).